United States Patent [19]

Kutaragi et al.

[11] Patent Number: 4,942,486
[45] Date of Patent: Jul. 17, 1990

[54] RECORDING DISK HAVING READ-ONLY RECORDING AREA AND WRITABLE RECORDING AREA AND A DRIVING APPARATUS THEREFOR

[75] Inventors: Ken Kutaragi, Kanagawa; Shoji Tanaka, Tokyo; Yasushi Fujinami, Kanagawa, all of Japan

[73] Assignee: Sony Corporation, Tokyo, Japan

[21] Appl. No.: 214,121

[22] Filed: Jun. 30, 1988

[30] Foreign Application Priority Data

Jul. 1, 1987 [JP] Japan .................................. 62-164183

[51] Int. Cl.$^5$ .................................................. G11B 5/09
[52] U.S. Cl. .......................................... 360/48; 360/60
[58] Field of Search ................. 360/48, 77.04, 77.08, 360/77.11, 135, 57; 369/275

[56] References Cited

U.S. PATENT DOCUMENTS

| 4,229,808 | 10/1980 | Hui | 360/48 |
| 4,499,574 | 2/1985 | Braat | 369/275 |
| 4,672,600 | 6/1987 | Balston et al. | 369/275 |
| 4,797,752 | 1/1989 | Giddings | 369/275 |
| 4,821,253 | 4/1989 | Usui et al. | 360/48 |

FOREIGN PATENT DOCUMENTS

| 0020239 | 1/1986 | Japan | 369/275 |
| 0168148 | 7/1986 | Japan | 369/275 |
| 0280048 | 12/1986 | Japan | 369/275 |
| 2036410 | 11/1979 | United Kingdom . | |

Primary Examiner—Vincent P. Canney
Attorney, Agent, or Firm—Lewis H. Eslinger; Jay H. Maioli

[57] ABSTRACT

A record disk has a read-only track area and a writable track area in which a guard band of a sufficient width is formed between such two areas for prevention of erroneous writing into the read-only track area during data writing into the writable track area. Apparatus using such disk employs a pair of heads with opposite azimuth angles and erasing of a track is first checked to prevent a read-only track from being erased. During such track erasing, a track recorded by a head with one azimuth is erased by a head with the other azimuth.

3 Claims, 12 Drawing Sheets

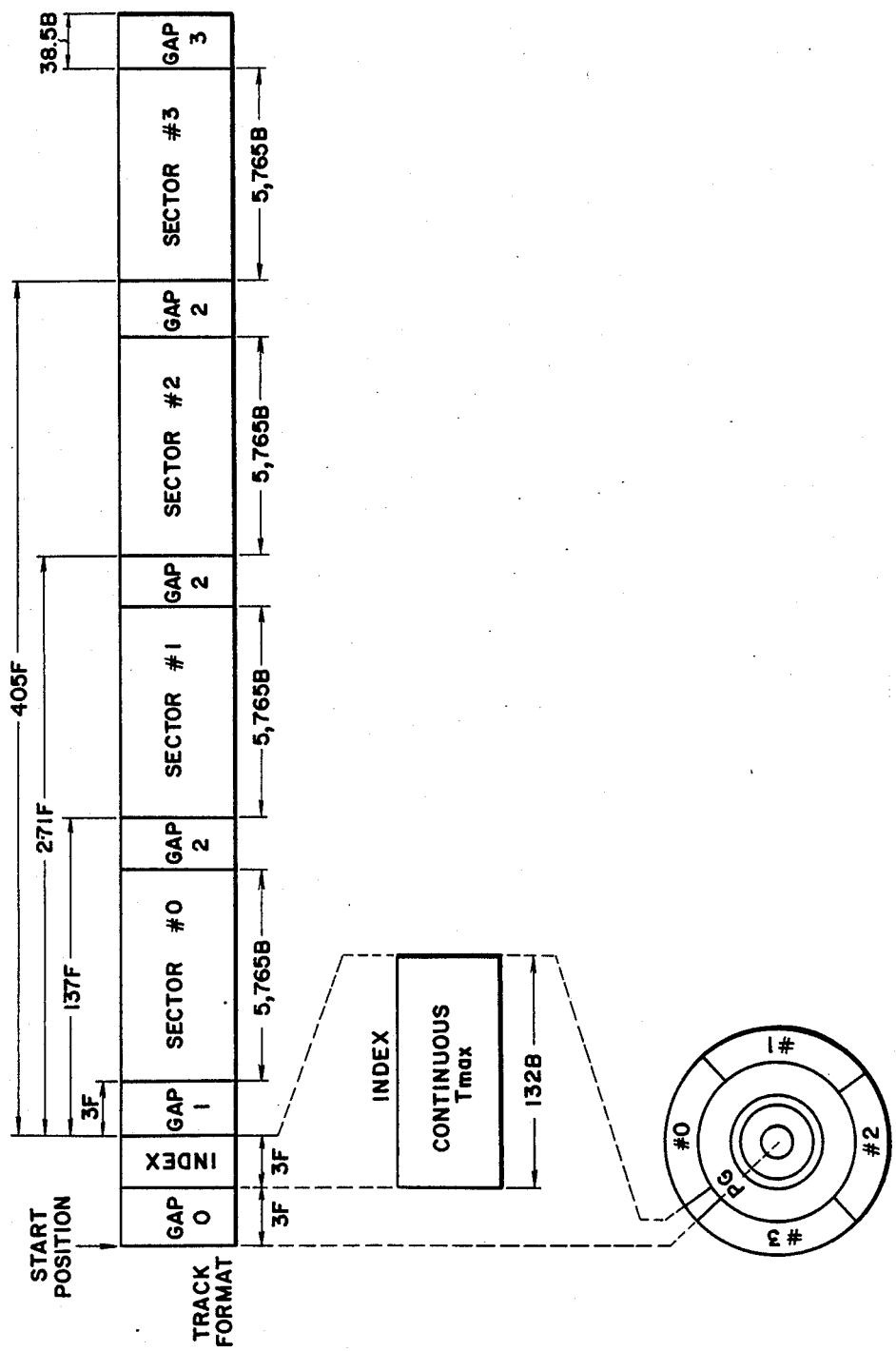

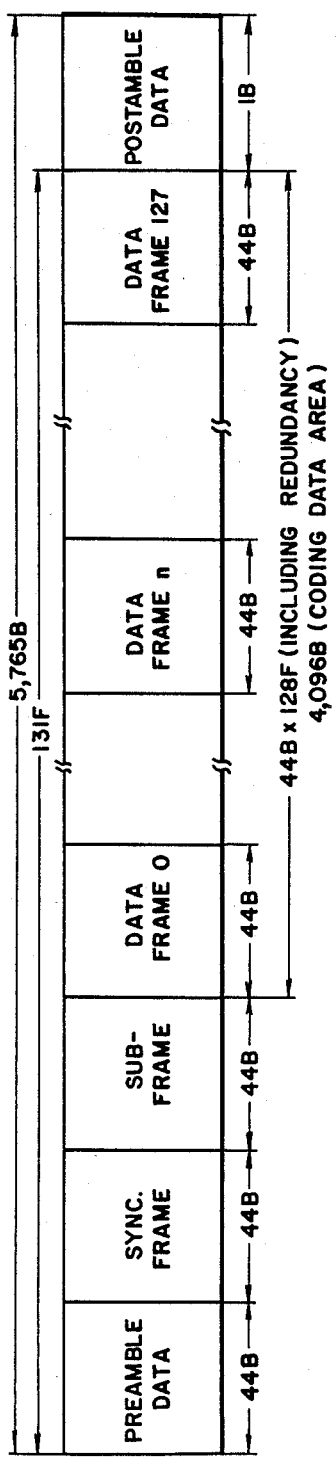
FIG. 4 SECTOR FORMAT
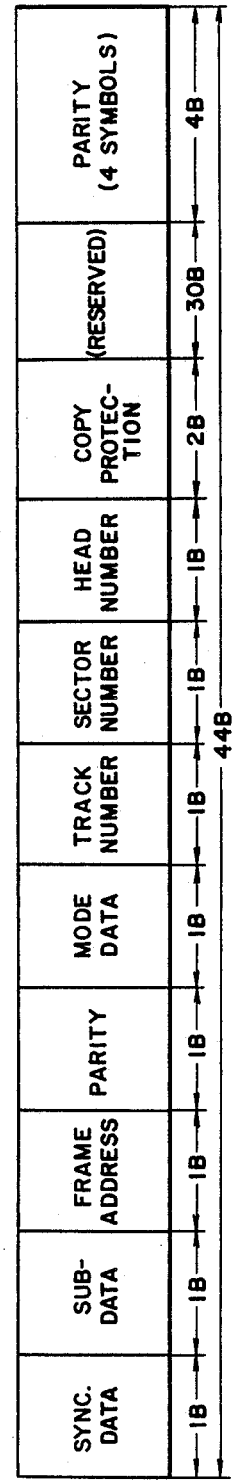
FIG. 5 SUB-FRAME FORMAT
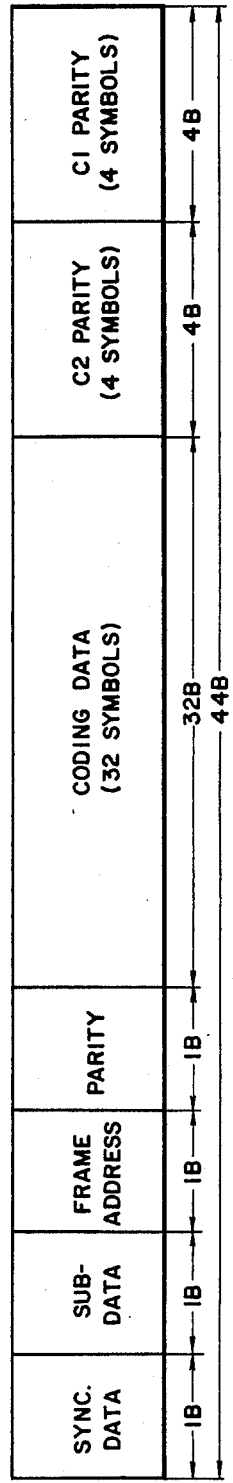
FIG. 6 DATA FRAME FORMAT

FIG. 7A

| FRAME ADDRESS | 0 | — | 31 | 32 | — | 63 | 64 | — | 95 | 96 | — | 127 |
|---|---|---|---|---|---|---|---|---|---|---|---|---|
| SUB-CODE ASSEMBLY | SUB-CODE #0 | | | SUB-CODE #1 | | | SUB-CODE #2 | | | SUB-CODE #3 | | |

| SUB-CODE | MODE DATA | TRACK NUMBER | SECTOR NUMBER | HEAD NUMBER | COPY PROTECTION CODE | READ ONLY AREA CODE | (RESERVED) | C1 PARITY (4 SYMBOLS) |
|---|---|---|---|---|---|---|---|---|
| | 1B | 1B | 1B | 1B | 2B | 1B | 21B | 4B |

32B

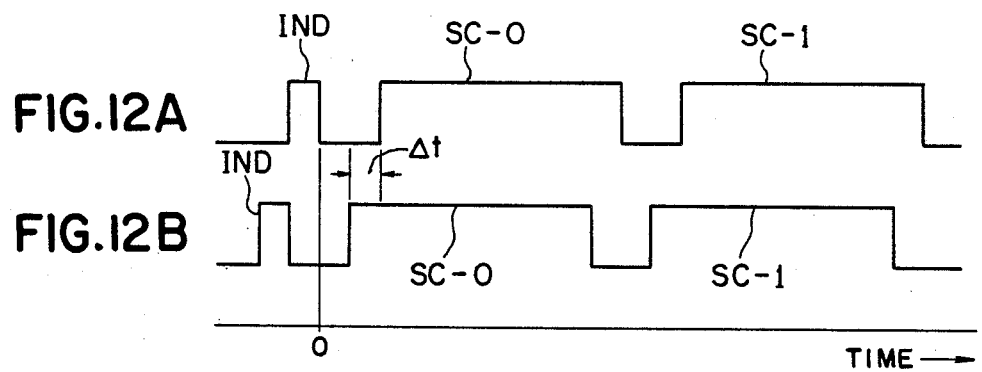

RECORDING DISK HAVING READ-ONLY RECORDING AREA AND WRITABLE RECORDING AREA AND A DRIVING APPARATUS THEREFOR

BACKGROUND OF THE INVENTION

1 Field of the Invention

The present invention relates generally to a recording disk and a driving apparatus therefor and, more particularly, to a disk having a read-only recording area and a writable recording area and to an apparatus for driving such disk.

2. Description of the Background

In most cases a magnetic disk, such as a floppy disk, hard disk or the like, has its entire surface, that is, all of the tracks thereof, rendered writable. Although a re-write inhibit flag can be added to the written data to prevent erroneous renewal or writing over of the data, the area for such flags is not specified previously in the disk format. Therefore, taking into consideration the positional error of a track produced in a write operation and the scanned positional error of a track that occurs in a read operation, it is impossible in practice to narrow the track pitch or to narrow the width of the intertrack guard band by an appreciable amount. Consequently, an increase in recording density is not achievable in such a magnetic disk.

OBJECTS AND SUMMARY OF THE INVENTION

It is therefore an object of the present invention to provide an improved recording disk and a driving apparatus thereof that eliminates the above-noted drawbacks inherent in known systems.

Another object of the present invention is to provide a recording disk and a driving apparatus therefor, wherein the recording density can be increased to a great extent, yet while maintaining the ability to accurately write data with high reliability.

In accordance with an aspect of the present invention, there is provided a recording disk having a read-only track area and a writable track area, wherein a guard band is formed between the read-only track area and the writable track area, and wherein the guard band has a specific, predetermined width that is sufficient to prevent erroneous writing into the read-only track area during the time of data writing into the writable track area yet is small enougtht not to adversely affect the amount of data that can be recorded on the disk.

According to another aspect of the invention, apparatus adapted for driving such a disk is provided and is equipped with a read/write head and a system for preventing data writing into the read-only track area when the data has been read out therefrom.

In a further aspect of the invention, a magnetic disk driving apparatus comprising a pair of write/read/erase magnetic heads having mutually different gap azimuths is provided to write a signal into each of a number of tracks on a magnetic disk in such a manner that the recording azimuths become alternately different, the magnetic heads being so disposed as to scan the same track on the magnetic disk for reading and erasing the signal written into each respective track. An erase signal source for selectively supplying an erase signal to the pair of magnetic heads is also provided and an erase timing control circuit responsive to a detection signal representing the reference rotational position of the magnetic disk as read out by one of the magnetic heads from a certain track having the same recording azimuth as the gap azimuth of such one head controls the timing to supply the erase signal from the erase signal source to another magnetic head for erasing the signal written into the certain track.

The above and other objects, features, and advantages of the present invention will become apparent from the following detailed description of illustrative embodiments thereof to be read in conjunction with the accompanying drawings, in which like reference numerals represent the same or similar elements.

BRIEF DESCRIPTION OF THE DRAWINGS

FIG. 3 is a diagrammatic representation of a data recording format for a disk according to an embodiment of the present invention;

FIG. 4 is a representation of a sector format used in the data format of FIG. 3;

FIG. 5 is a representation of a sub-frame format used in the sector format of FIG. 4;

FIG. 6 is a representation of a data frame format used in the sector format of FIG. 4;

FIGS. 7A and 7B schematically show a sub-code data format made up of the sub-frame format and data frame format of FIGS. 5 and 6, respectively;

FIGS. 12A and 12B are timing charts useful in explaining the operation of the recording/reproducing/erasing circuit shown in FIG. 11.

DETAILED DESCRIPTION OF THE PREFERRED EMBODIMENTS

Figure 1:
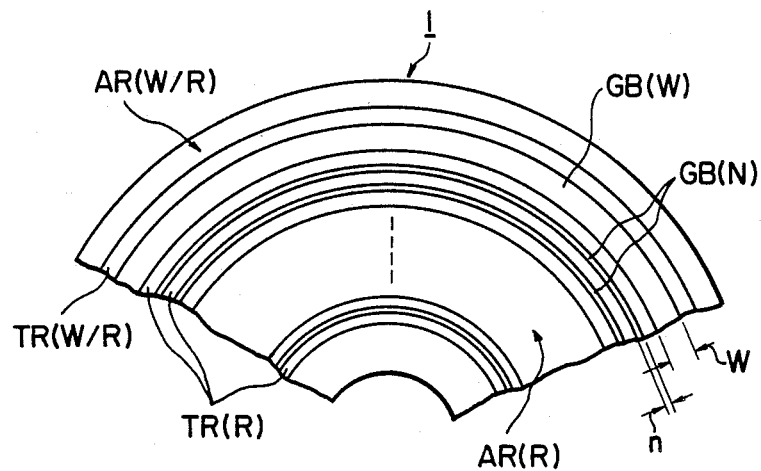
FIG. 1 is a schematic representation of a part of a track pattern of the recording disk according to an embodiment of the present invention.

In FIG. 1, a 2-inch floppy disk 1 has a read-only track area AR(R) in an inner, annular region and a writable track area AR(W/R) in an outer peripheral region. The read-only area AR(R) consists of a multiplicity of read-only tracks TR(R), and a guard band GB(N) of a width n is formed between each of the read-only tracks TR(R). The writable area AR(W/R) in this embodiment is formed of a single readable/writable track area TR(W/R) and is located outside the read-only track area AR(R) toward the outermost periphery of the floppy disk 1. A guard band GB(W) of a width w is formed between the writable track area TR(W/R) and the read-only track TR(R) at the outermost periphery of the read-only track area AR(R). The number of such writable tracks TR(W/R) is not limited to one and may be two or more, however, the width of the guard band between the writable tracks TR(W/R) is selected to be greater than the width n of the guard band GB(N) between the read-only tracks TR(R). The writable track area AR(W/R) need not necessarily be on the outer periphery of the disk but it must be separated from the read-only track area AR(R). Therefore, the writable track area AR(W/R) could also be located at the innermost portion of floppy disk 1.

In this embodiment, the recording azimuths of the read-only track TR(R) and the writable track TR(W/R) are selected to be equal to each other in a direction orthogonal to the extension of the track but to be in opposite direction.

Because the read-only track TR(R) is formed by recording specific data, such as a program for a video game or the like, using a dedicated recorder, the recording positional error of each track is small. Therefore, the width n of the guard band GB(N) between the read-only tracks can be selected to be smaller than the guard band of the writable track due to the scanning positional error of each track in the read operation.

In order to prevent any erroneous writing into the read-only tracks TR(R) that may result from scanning positional deviations of the magnetic head at the time of writing into the writable track TR(W/R), the width w of the guard band GB(W) between the writable track TR(W/R) and the last read-only track TR(R) at the outermost periphery of the read-only track area AR(R) is selected to be greater than the width n of the guard band GB(N) that is between the read-only tracks AR(R).

In the case where the program data for a video game, for example, has been written in the above-described read-only track area AR(R), the writable track area AR(W/R) can be used for writing therein and reading out therefrom such data as the names of the game players, their scores, and so forth. In that situation, one or two writable tracks TR(W/R) at the most are usually sufficient to meet this requirement. In such case, the write or read operation is usually performed immediately after loading the floppy disk in a disk driving apparatus or immediately before unloading the disk therefrom. Nevertheless, depending on the contents of the data written in the read-only track area AR(R), the number of the writable tracks TR(W/R) may be increased.

Figure 2:
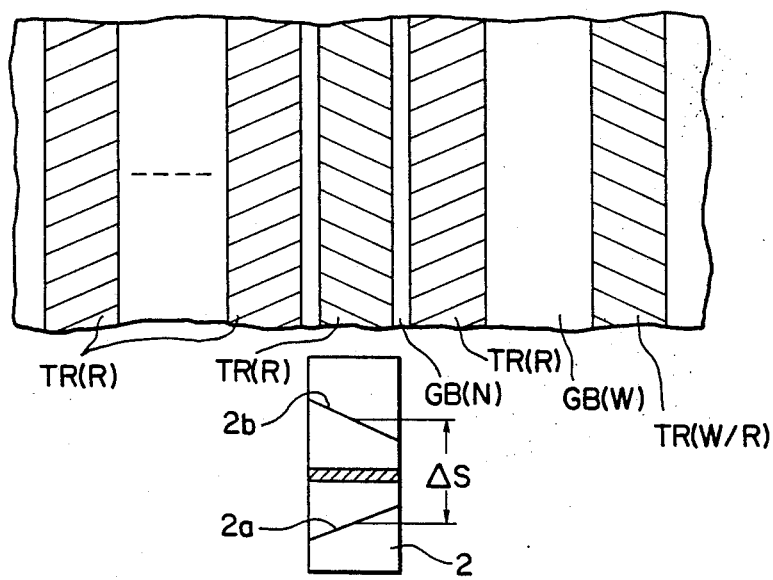
FIG. 2 is an enlarged view of the track pattern of FIG. 1 shown with an adjacent recording/reproducing head.

In order to increase the recording density as much as possible by minimizing the width of the guard band GB(N) between the read-only tracks TR(R) in the read-only track area AR(R), it will be advantageous to make the recording azimuths of the adjoining tracks different from each other in an alternating fashion, as shown in FIG. 2. In such case, the same arrangement will be adopted with respect to the writable track area TR(W/R) as well. A magnetic head 2 for writing the data into and reading out same from the tracks TR(R) and TR(W/R) is a multi-head structure with a pair of heads having respective gaps 2a and 2b of mutually different azimuth angles in the track scanning direction. Actually, the angles are the same, they are just in a different direction.

In order to prevent data from being written again into the read-only track TR(R) on floppy disk 1 after previously writing therein, a code representing the read-only action is written. For example, such code may be written in the sub-code format of each sector of the tracks TR(R) and TR(W/R), as will be described below.

The formats of the individual tracks are described with reference to FIGS. 3 and 7, in which FIG. 3 shows a track format in which each track is formed by an index and four sectors #0 through #3. Thus, from the start position each track is comprised of a gap 0 (pre-index gap), index, gap 1 (post-index gap), sector #0, gap 2 (sector gap), sector #1, gap 2 (sector gap), sector #2, gap 2 (sector gap), sector #3, and a gap 3 (the last gap). The index is a continuous Tmax signal, where Tmax means the longest or maximum transition interval in a run-length-limited code, such as MFM, ERM, $M^2$, 8/10 modulation, and the like. In this embodiment of the present invention employing the 8/10 conversion code, Tmax is 4T in NRZI-modulated channel code. Thus, the continuous Tmax signal is 100010001000 . . . . . It is noted that one frame (F) is composed of 44 bytes (B), with each byte including 10 channel bits.

PG denotes a rotational phase detection signal that is produced upon rotation of a spindle motor adapted for rotationally driving the floppy disk. This signal is correlated to the index.

FIG. 4 shows a sector format, in which each sector is formed of preamble data, a sync frame, sub-frame, coding data, which data frames 0 to 127, and postamble data, in that order, and has a total length of 5765 bytes. The preamble and postamble data each have a value "2B" in hexadecimal notation, that is, a value of "0010 1011" in binary.

FIG. 5 shows a sub-frame format, in which each sub-frame is formed by sync data, sub-data, frame address, parity codes for the sub-data and address, mode data, track number, sector number (#0, #1, #2, or #3), head number, copy protection code, a reserved area, and parity codes (4 symbols) for data following the frame address and mode data, in that order. Each sub-frame has a length of 44 bytes.

FIG. 6 shows a data frame format, in which each data frame is formed by sync data, sub-data, frame address, parity codes for sub-data and address, coding data (32 symbols), $C_2$ and $C_1$ parity codes (each of 4 symbols), in that order. Each data frame has a length of 44 bytes.

The sub-code is an assembly formed of 128 bytes each being the 1-byte sub-data of the data frame shown in FIG. 6 and each being taken from a respective one of the 128 data frames that make up one sector, as shown in FIG. 7A. In this embodiment, there are sub-codes #0, #1, #2, and #3. As shown in FIG. 7B, each sub-code is formed of mode data, track number, sector number, head number, copy protection code, read-only area code, a reserved area, and parity codes (4 symbols) for the preceding data, in that order. Each sub-code has a length of 32 bytes.

Figure 8:
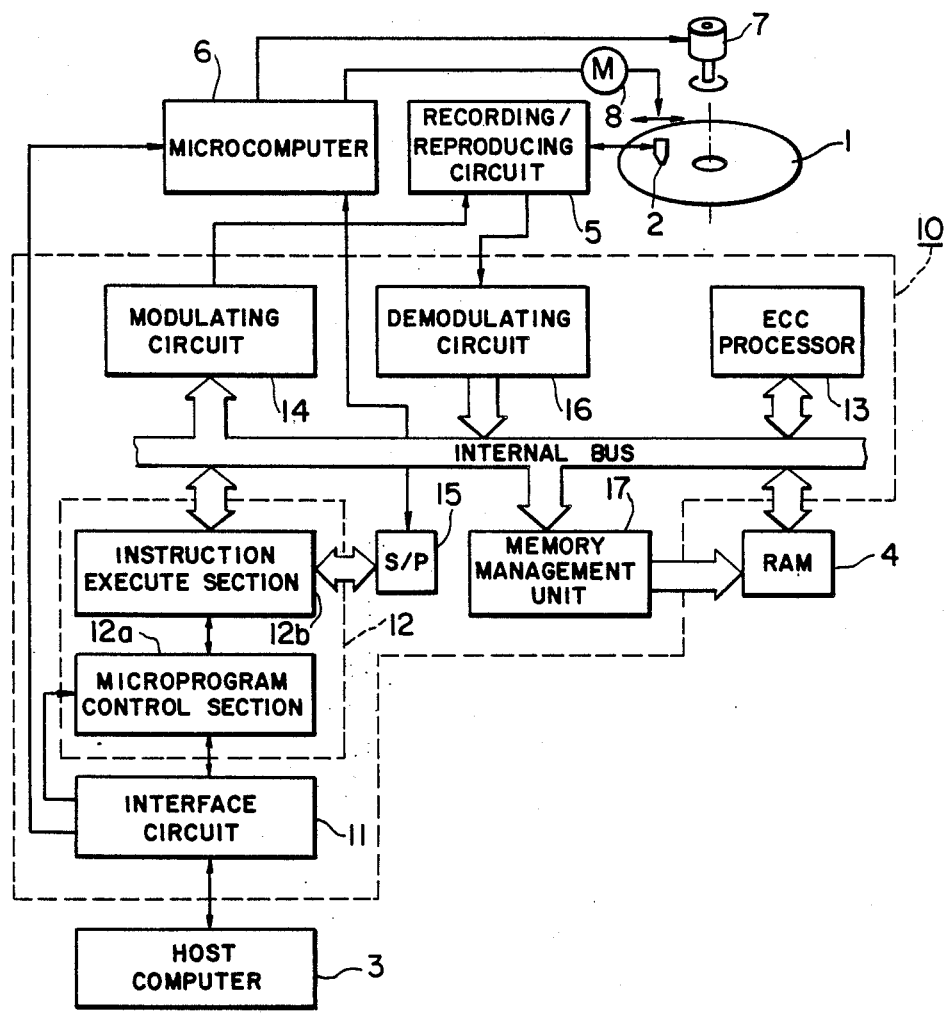
FIG. 8 is a schematic in block diagram form of the recording disk driving apparatus according to an embodiment of the invention.

The apparatus for recording and/or reproducing the data having the above-described data formats on or from the disk is shown in FIG. 8, in which the data to be recorded are supplied from a host computer 3 to a buffer memory 4 by way of an interface circuit 11 and a disk controller 12, both of which are within a disk control section 10, and an internal bus. An S-RAM having a storage capacity on the order of 8 k-bytes for each sector is advantageously employed as buffer memory 4. The data written into buffer memory 4 are subjected to encoding processing, that is, the formation and annexation of the $C_2$ and $C_1$ parity codes, by an error correction processor 13 that performs the encoding and decoding functions. The encoded output from buffer memory 4 is supplied through the internal bus to a modulating circuit 14, where it is subjected to processing, such as 8/10 conversion, before it is supplied to magnetic head 2 via a recording/reproducing circuit 5 so as to be recorded on floppy disk 1. Floppy disk 1 is rotated at 3600 rpm, for example, by a spindle motor 7 controlled by a microcomputer 6 adapted to control the mechanical system. The movement of magnetic head 2 is also under the control of microcomputer 6. A serial/parallel interface 15 is provided between microcomputer 6 and disk controller 12 to effect serial communication It will be noted in the following that recording/reproducing circuit 5 also provides the function of an erasing circuit.

The data read out by magnetic head 2 from floppy disk 1 is supplied via recording/reproducing circuit 5 to a demodulating circuit 16, wherein the data are subjected to processing including 10/8 conversion, after which they are sent to and written in buffer memory 4. The one-sector data written in buffer memory 4 are subjected to a predetermined decoding, such as error correction using the $C_1$ and $C_2$ parity codes and removal of the redundancy bits, before they are supplied via disk controller 12 and interface circuit 11 to host computer 3.

Disk controller 12 is made up of a microprogram control section 12a and an instruction execute section 12b, in which microprogram control section 12a interprets or construes simple instructions supplied from host computer 3 via interface circuit 11, so as to supply the micro-codes to instruction execute section 12b for controlling a series of write/read control operations. The control data formed in the disk controller 12 is supplied via the internal bus to a memory management unit 17.

Disk control section 10, which includes interface circuit 11, disk controller 12, an error correction processor 13, demodulating circuit 16, memory management unit 17 and serial/parallel interface 15, may be formed as a single LSI chip (large-scale integrated circuit).

Figure 9:
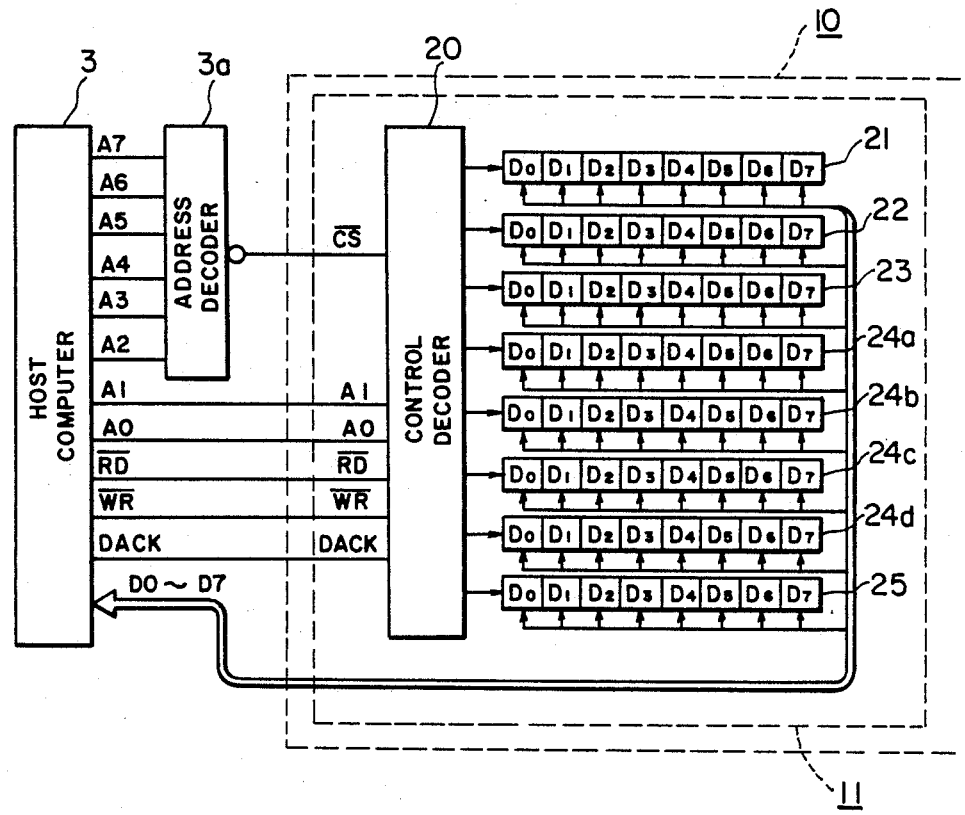
FIG. 9 is a schematic in block diagram form of an interface circuit and its peripheries used in the circuit of FIG. 8.

As shown in FIG. 9, interface circuit 11 is provided with five kinds of registers for interfacing between a control decoder 20 and host computer 3. For example, a 1-byte reset register 21, a 1-byte status register 22, a 1-byte command register 23, a 4-byte parameter register 24a-24d and a 1-byte data register 25 are employed in interface circuit 11.

These five kinds of registers are selected at a control decoder 20 by 6-bit data. More specifically, such 6-bit data is made up of address bits $A_0$ and $A_1$ supplied from host computer 1, read command bit $\overline{RD}$, write command bit $\overline{WR}$, chip selected $\overline{CS}$ obtained by decoding the address at decoder 3a, and a DMA acknowledge bit $\overline{DACK}$. This data is further shown in Table 1.

Table 1: Operating State of Interface Circuit

TABLE 1

| | | | Operating State of Interface Circuit | | |
|---|---|---|---|---|---|
| $\overline{DACK}$ | $\overline{CS}$ | $A_1$ | $A_0$ | $\overline{RD}$ | $\overline{WR}$ | Operating State |
| 1 | 0 | 1 | 1 | 1 | 0 | reset system |
| 1 | 0 | 0 | 0 | 0 | 1 | read status register |
| 1 | 0 | 0 | 0 | 1 | 0 | write command register |
| 1 | 0 | 0 | 1 | 0 | 1 | read parameter register |
| 1 | 0 | 0 | 1 | 1 | 0 | write parameter register |
| 1 | 0 | 1 | 0 | 0 | 1 | program reading of data |
| 1 | 0 | 1 | 0 | 1 | 0 | program writing of data |
| 0 | 1 | — | — | 0 | 1 | DMA reading of data |

TABLE 1-continued

| | | | Operating State of Interface Circuit | | |
|---|---|---|---|---|---|
| $\overline{DACK}$ | $\overline{CS}$ | $A_1$ | $A_0$ | $\overline{RD}$ | $\overline{WR}$ | Operating State |
| 0 | 1 | — | — | 1 | 0 | DMA writing of data |

Reset command data for initializing the floppy disk apparatus and calibrating the drive are supplied to reset register 21. When the reset command is supplied to reset register 21, the operation of spindle motor 7 ceases immediately and magnetic head 2 is returned to its home position.

As shown diagrammatically in FIG. 9, interface circuit 11 is constructed so that the 8-bit reset data $D_7-D_0$ supplied from the host computer 3 via the interval data bus are written in reset register 21 by write pulses from host computer 3. In the present embodiment, the least significant bit $D_0$ and the second lower bit $D_1$ of the aforementioned 8-bit reset data $D_7-D_0$ are used as the reset flag for microprogram control section 12a, shown in FIG. 8, and as the reset flag for microcomputer 6 that operates as the mechanical system controller, also shown in FIG. 8. In this fashion microprogram control section 12 and microcomputer 6 of the mechanical system controller are separately reset.

During the time microprogram control section 12a is performing this series of control operations for the floppy disk apparatus, host computer 3 monitors the contents of status register 22 or parameter registers 24a-24d in such a manner that, upon detection of an erroneous or mistaken operation, reset data are supplied to reset register 21 of interface circuit 11 for individually resetting microprogram control section 12 or microcomputer 6 of the mechanical system controller. By this resetting operation, the floppy disk apparatus may take proper measures in connection with the mistaken operation or can initialize microcomputer 6 of the mechanical system controller for efficient data recording and reproduction to and from disk 1 during the period microprogram control section 12 is performing the processing operation.

Although microprogram control section 12 and microcomputer 6 of the mechanical system controller are reset separately in the above embodiment, the number or the function of the devices to be reset may be increased by a corresponding increase in the number of bits of the reset register.

Status register 22 indicates the status of floppy disk 1 using 8 bits, and the status information is transmitted to host computer 3. In status register 22, the most significant $D_7$ bit or $D_7$ (non-DMA data request) flag is used for hand-shaking in the case of data transfer between the register and the external system, that is, host computer 3, as shown in FIG. 9. This $D_7$ or non-DMA data request flag becomes "1" each time a data transfer is enabled, becomes "0" during data transfer, and again becomes "1" on completion of the 1-byte data, so that it is repeatedly inverted between the states "1" and "0" until a predetermined number of times for a transfer is reached. The next bit $D_6$ or $D_6$ (no media) flag indicates whether a floppy disk is mounted, thus, becoming "1" when the floppy disk 1 is not mounted or when it is pulled out during the mounting operation by actuation of an eject button. The next bit $D_5$ or $D_5$ (media change) flag indicates the possibility of the floppy disk 1 having been changed, thus, becoming "1" when the reset is made, when floppy disk 1 once ejected is not as yet reattached, or when floppy disk 1 is pulled out during the disk attachment operation by actuation of the eject button. The $D_5$ bit or the media change flag reverts to "0" when the data is read correctly from floppy disk 1. The next $D_4$ bit or $D_4$ (write protect) flag indicates the write inhibit state to floppy disk 1. Thus, when no floppy disk 1 is inserted or a floppy disk to which writing is inhibited is inserted, the flag becomes "1" and when floppy disk 1, on which writing can be made, is inserted it becomes "0". The next $D_3$ bit or $D_3$ (ECC error (MSB)) flag and the $D_2$ bit or $D_2$ (ECC error (LSB)) flag uses 2 bits to indicate in four status values what error has taken place in the course of the error detection and correction carried out automatically at error correcting section 13 as the reading operation progresses.

The next $D_1$ bit or the $D_1$ (drive error) flag indicates a mistaken drive operation. Thus, when the drive function is not executed correctly, it becomes "1" and is maintained in the "1" state until the read/write/erase operation is executed correctly next time or until the above reset command is received. The least significant $D_0$ bit or the $D_0$ (command busy) flag indicates the state of execution of the commands other than the above reset command. Thus it becomes "1" during execution and practice of the commands other than the above reset command and resets to "0" with the end of processing.

All the command data for controlling the floppy disk apparatus are supplied to command register 23 so that the respective basic functions are enabled when the corresponding bits are set to "1". Microprogram controller 12 interprets or construes the contents of the 1-byte command data afforded to command register 23 at host computer 3 to cause instruction execute section 12b to carry out the data erasure, recording, or reproduction automatically and in a prescribed order.

Referring once again to FIG. 9, drive designate commands (unit select 1, unit select 2) are afforded to upper $D_7$ and $D_6$ bits of command register 23. Up to a maximum of four drive designations can be made by the above 2-bit drive designation commands (unit select 1, unit select 2). An execution inhibit command is afforded to the next $D_5$ bit. Setting the $D_5$ bit to "0" invalidates the function specified or commanded at the lower $D_4$ to $D_0$ bits. When the processing accompanied by execution is carried out, the $D_5$ bit is set to "1". The command (Mon: Motor On) for commanding the on-state of spindle motor 7 is afforded to the $D_4$ bit. Spindle motor 7 is driven into rotation when the $D_4$ bit is set to "1" and spindle motor 7 is halted after a predetermined time when the $D_4$ bit is set to "0"". When spindle motor 7 starts its rotation, magnetic head 2 is moved from its home position toward the outer periphery and, when spindle motor 7 is halted, magnetic head 2 reverts to the home position from its then current position. It is noted that the $D_4$ bit need not be set to "1" for each ordinary read/write/erase operation, and microprogram control section 12 is so designed and arranged that the rotation of spindle motor 7 is automatically started with the read/write/erase operation even if the $D_4$ bit is "0", and that spindle motor 7 is halted after the lapse of a certain predetermined time following the end of processing. The data transfer command is supplied at the next $D_3$ bit. With the $D_3$ bit set to "1", data transmission and reception may occur between floppy disk apparatus and host computer 3. The above data transmission and reception occurs by sequential transfer to buffer memory 4 via the data register. In this case, one of 4 K bytes, 512 bytes or 256 bytes may be selected as the number of the transferred data, while the address in each 4 K byte address can be specified or designated. The memory area of 4 K bytes is divided into the minimum unit of 256 bytes and each unit has its own header address. Therefore, when 256 byte data is transferred one of the header addresses is selected or designated. It is noted that buffer memory 4 may be used as a transient bank memory for host computer 3 without depending on the operation of the floppy disk device. It may be accessed not only by the physical sector units of 4 K bytes but by the logical sector units of 512 and 256 bytes. The erasure command (ER: erase) is afforded to the next $D_2$ bit. With the $D_2$ set to "1", erasure can be effected with the physical sector unit selected at parameter register 24. The write command (WR:write) is afforded to the next $D_1$ bit, with the $D_1$ bit set to "1" writing can be effected at the physical sector unit specified at parameter registers 24a-24d. Index signals are recorded when the index is specified at parameter registers 24a-24d. Under the write command WR, microprogram control section 12a performs processing in accordance with a predetermined sequence for writing the data in floppy disk 1. Thus, the parity data/sub-code data/header information for error correction is generated automatically in error correction processor 13 and outputted sequentially in accordance with a predetermined format. Under the write command WR, a series of data transfer-/erase/write operations can be executed, and microprogram control section 12 performs automatic processing in accordance with a predetermined sequence. The read command (RD: read) is afforded to the next $D_0$ bit. With the $D_0$ bit set to "1", reading is performed with the physical sector unit designated at parameter registers 24a-24d. Index designation at parameter registers 24a-24d is ineffective and results in a drive error in status register 22. Under the read command (RD), program control section 12a performs processing in accordance with a predetermined sequence for reading data from floppy disk 1 and, at the same time that the signals are read from floppy disk 1, causes error correction processor 13 to perform erroneous data detection/correction on the data read into buffer memory 4 in accordance with the predetermined format. The transfer of data reproduced from floppy disk 1 to buffer memory 4 and the transfer of data from buffer memory 4 to host computer 3 are performed under the above read command (RD), and are automatically effected by microprogram control section 12 in accordance with a predetermined sequence. When the reading is completed in a regular manner, the reproduced track/sector number is written into parameter registers 24a-24d.

The parameter data for designating the writing of the index signals, erasure of the track units and the track/sector number when the reading/writing/erasure is performed by the physical sector units or on the physical sector basis are afforded to parameter registers 24a-24d. Parameter registers 24a-24d can accommodate 4 bytes, and a register pointer, not shown, is advanced each time one byte is read or written, and reverts to the first byte when the accessing is continued further after completion of the reading of the last byte, herein the fourth byte, or after completion of the writing of the second byte. It is noted that the pointer reverts to the first byte at the time when accessing to a register other than parameter registers 24a-24d is performed to initialize the reception sequence of parameter registers 24a–24d.

The first byte of parameter registers 24a–24d is used as the physical sector address accompanied by the reading/writing/erasure operation and as sector register 24a for track erasure designation, index writing designation, logical sector size selection designation and virtual logical sector address designation to effect the data transfer between the buffer memory 4 and host computer 3. Sector register 24a designates selectively the three kinds of logical sector size at the upper bits $D_7$ and $D_6$ while designating the index writing and erasure of one track in its entirety (1, 1). When the write/erase combinational command is afforded to command register 23, with the upper two bits $D_7$ and $D_6$ of sector register 24a being set to (1, 1), microprogram control section 12a causes the index signals to be written after erasure of the track in its entirety. With the index signals thus written into floppy disk 1, it may then be accessed by physical sector units. The next two bits $D_5$ and $D_4$ designate the 4 K byte physical sector address and assume effective values when the reading operation is normally carried out. These bits can be collated as the occasion may require with the physical sector address designated at host commuter 3. The lower four bits $D_3$, $D_2$, $D_1$ and $D_0$ designate the logical sector address of the 512 byte units.

The second byte of parameter registers 24a–24d is used in a track register 24b for designating the track number. When the reading is performed in a regular manner, the lower seven bits of track register 24b become effective as the track number and can be collated as the occasion may require with the track address designated at host computer 3. The 2-byte copy protection code CPC is afforded to two registers 24c, 24d at the third and fourth bytes of parameter registers 24a–24d.

Data register 25 is used for data transfer between floppy disk 1 and host computer 3. Both the program and the direct memory access (DMA) are transferred through this register 25.

Figure 10A:
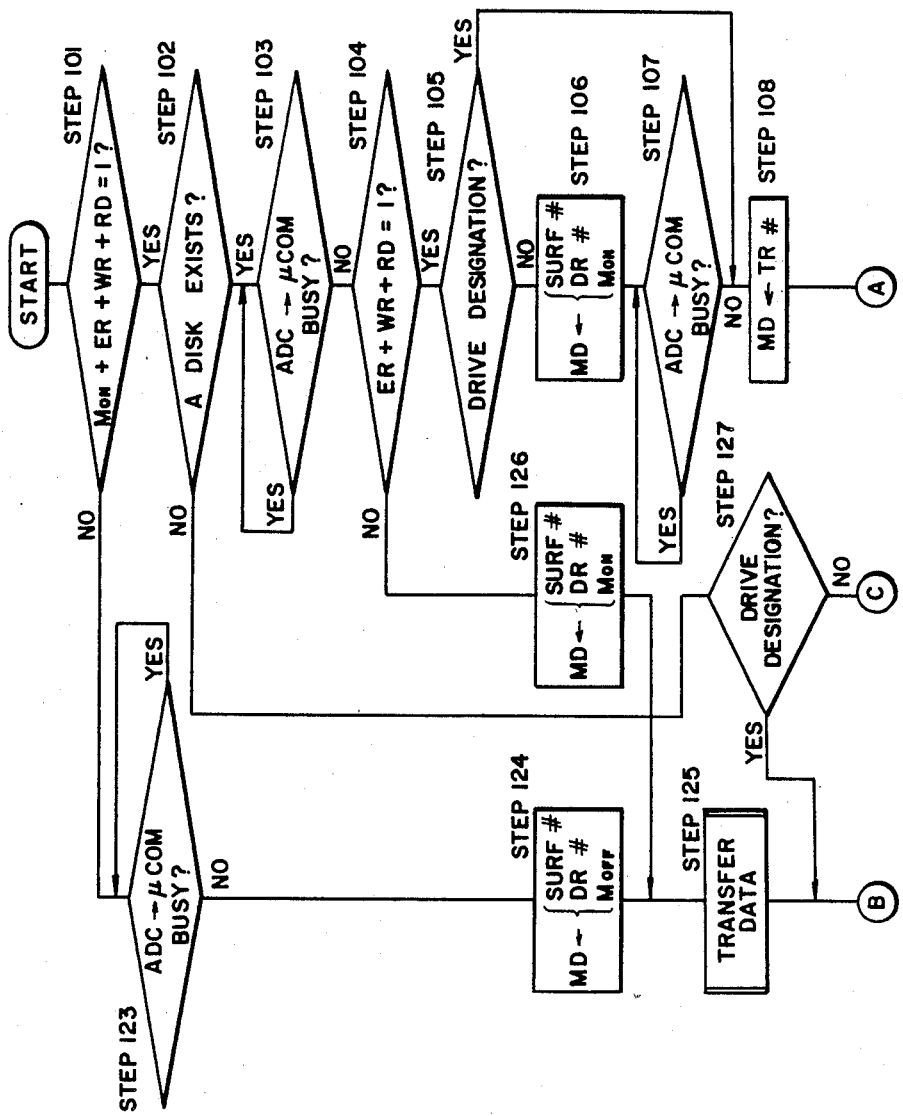
FIG. 10A, 10B, and 10C are flow charts useful in explaining the operation of the driving apparatus shown in FIG. 8.
Figure 10B:
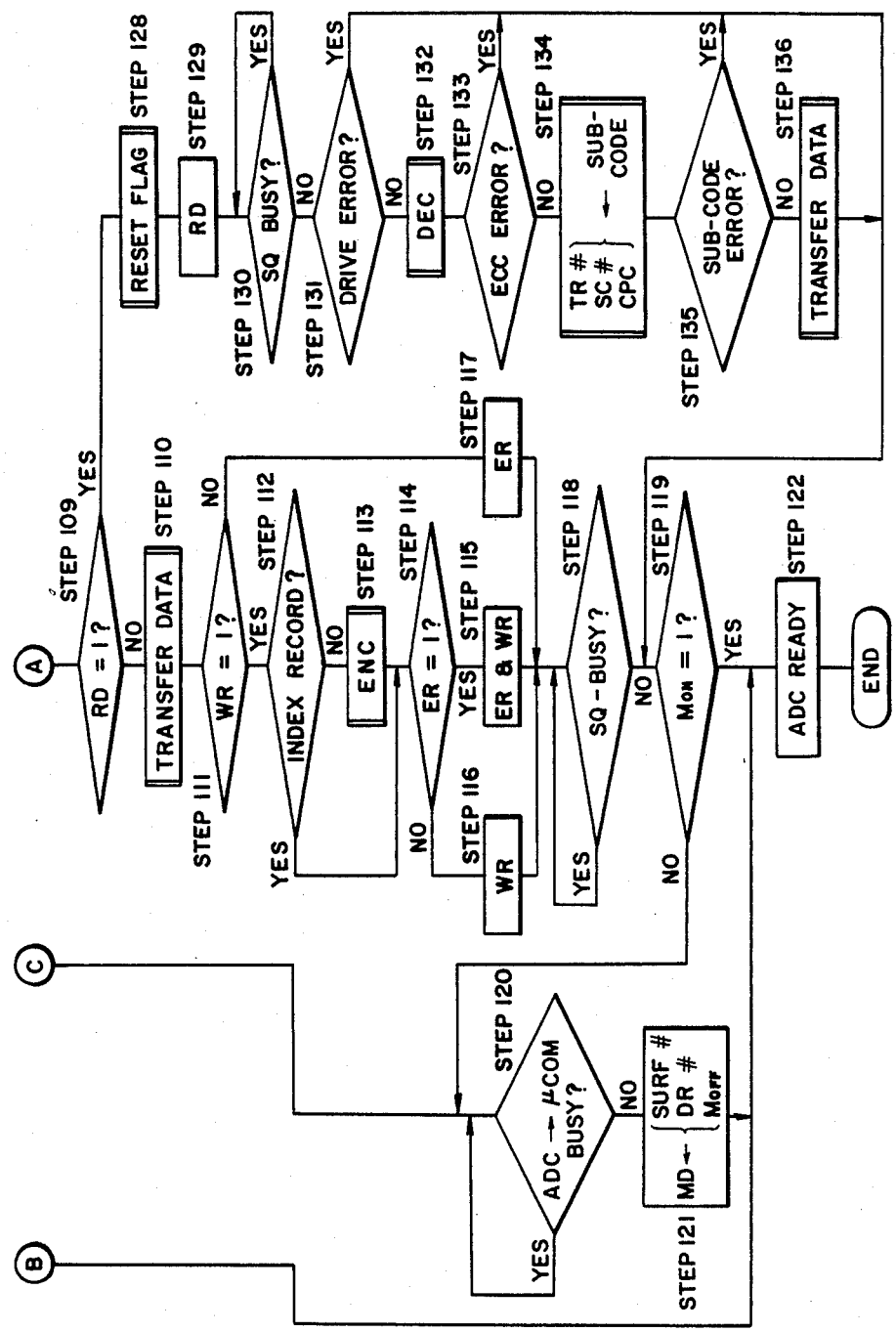

The operation of the above-described disk data recording/reproducing apparatus is explained referring to the flow charts of FIGS. 10A and 10B in which it is first determined at step 101 whether "1" has been set at the $D_4$ (Mon) bit, $D_2$ (ER) bit, $D_1$ bit or $D_0$ (RD) bit of the command register by command data supplied from host computer 3 to command register 23. If the result is affirmative, it is determined at step 102 whether floppy disk 1 has been attached in position by the contents of status register 22. If the result at step 102 is affirmative, that is, when the floppy disk 1 is attached in position, it is determined at step 103 whether control microcomputer ($\mu$COM) 6 for the mechanical system controller is performing the processing operation. When control microcomputer 6 is released from the processing operation, it is checked at step 104 whether "1" has been set at any one of the $D_2$ (ER), $D_1$ (WR) or $D_0$ (RD) bits of the command register 23. If the result at step 104 is affirmative, that is, when any of the erasure (ER), writing (WR) and reading (RD) operations has been issued from host computer 3, it is checked at step 105 whether the drive designation by bits $D_7$, $D_6$ of command register 23 has already been issued. If a new drive designation is issued, the disk surface number (SURF #), drive number (DR #) and the motor-on signal (MON) are supplied at step 107 to mechanical system controller 6. It is then checked at step 107 whether control microcomputer ($\mu$COM) 6 for the mechanical system controller is performing a processing operation. After the control microcomputer ($\mu$COM) 6 is released from the processing operation, the track number (TR #) set in the parameter registers 24a–24d is afforded at step 108 to the mechanical deck system controller MD 6. If the result at step 105 is affirmative, that is, when the drive designation has already been issued, the program proceeds immediately to step 108 to afford the track number (TR #) of parameter register 24 to the mechanical system controller (MD) 6. It is then determined at the next step 109 whether "1" has been set at the $D_0$ (RD) bit of command register 23. If the result at step 109 is negative, that is, then the reading command is not made, the data afforded to data register 25 is transferred at step 110 to buffer memory 4. It is then checked at step 111 whether "1" is set at the $D_1$ (WR) bit of command register 23. If the result at step 111 is affirmative, that is, when the write command is made by host computer 3, it is checked at the next step 112 whether the index write command is made on the basis of the first byte in parameter registers 24a–24d, that is, the $D_7$ and $D_6$ bits of sector register 24a. If the index write command is not made, the program proceeds to step 113 to perform the parity encoding operation (ENC) on the data written in buffer memory 4. It is then checked at step 114 whether "1" is st at the $D_2$ (ER) bit of command register 23. If the result at step 112 is affirmative, that is, when the index write command has been issued, the program proceeds immediately to step 114 to check if the erasure operation has been commanded at host computer 3. If the result at step 114 is affirmative, that is, when the erasure operation is commanded, the erasure operation (ER) and the write operation (WR) are performed at step 115. When the erasure operation (ER) is not commanded, only the write operation is performed at step 116. Then the result at step 111 is negative, that is, when the recording operation is not commanded, only the erasure operation (ER) is made at step 117. After the operations at the steps 115, 114, or 117 are made, status of the sequence is checked from the flags $D_0$ (Command Busy) at the status register 22 at step 118 to check the condition of the sequence to determine whether the operation at the step 115, 116, or 117 is terminated. The program then proceeds to step 119 to check if "1" has been set at the bit $D_4$ (Mon) of command register 23. If the result at step 11a is negative, it is then checked at step 120 whether control microcomputer 6 is performing the processing operation. When control microcomputer 6 is released from the processing operation, the disk surface number (SURF #), drive number (DR #) and the motor-off number (M off) are fed to the mechanical system controller (MD) 6 at step 121. The program then proceeds to the standby state at step 122.

It is noted that when the result at step 101 is negative, that is, when host computer 3 has not commanded the operation of the floppy disk apparatus, the program proceeds to step 123 to check if control microcomputer 6, which is also the mechanical system controller, is performing the processing operation. When control microcomputer 6 is released from the processing operation, the disk surface number (SURF #), drive number (DR #) and the motor off signal (M off) are supplied to control microcomputer 6 of the mechanical system controller at step 124 and data is transferred at step 125. The program then proceeds to a standby state at step 122. If the result at step 104 is negative, that is, when only the command for spindle motor 7 being turned on (M on) is issued at host computer 3 but the erasure (ER), writing (WR) or reading (RD) are not commanded, the program proceeds to step 126 to afford the disk surface number (SURF #), drive number (DR #) and the motor-off (M off) signals to microcomputer 6 for the mechanical system controller at step 124 to effect data transfer at step 125. When the result at step 102 is negative, that is, when floppy disk 1 is not attached in position, the program proceeds to step 127 to make a check of the drive designation. If the same drive is designated, the program proceeds immediately to step 122. If a new drive is designated, the program proceeds to step 120.

If the result at step 109 is affirmative, that is, when the read operation (RD) is commanded by host computer 3, the program proceeds to step 128 to reset the various flags. The data are then read from floppy disk 1 to buffer memory 4 at step 129. After reading out the data at step 129, the $D_0$ (command busy) flag of status register 22 is checked at the next step 130 to determine the status of the sequence to ascertain that the operation at the above step 127 is terminated. The program then proceeds to the next step 131 to check the $D_1$ bit of status register 22 to determine at step 129 if magnetic head 2 has been correctly moved to the target track and the data read-out operation has been correctly made. If there is no drive error, an error correction processing (DEC) is performed at step 132 at the error correction processor 13. At the next step 132, it is checked if there is any error that cannot be corrected by the error correcting processing at step 132. If there is no error, the track number (TR #), sector number (SC #) and the copy inhibit code (CPD) included in the sub-code data (SUB-CODE) of the read-out data are transferred to the parameter registers 24a–24d at step 134 to check for the presence or absence of the error of the sub-code data (SUB-CODE), the data read out at buffer memory 4 are transferred to host computer 3 through the aforementioned data register at step 136. The operation then proceeds to step 119.

If the results at the steps 131, 133 and 135 are affirmative, that is, when there is caused an error, the program proceeds immediately to step 119.

In the floppy disk apparatus of the present embodiment, microprogram control section 12 interprets or construes the command data $D_7$, $D_6$, $D_5$, $D_4$, $D_3$, $D_2$, $D_1$ and $D_0$ supplied from host computer 3 to command register 23 of interface circuit 11 to perform the following various control operations.

Control Operation 1

Command data ($D_7$, $D_6$, $D_5$, $D_4$, $D_3$, $D_2$, $D_1$, $D_0$)
 = (0 0 1 0 0 1 1 0)

(1) spindle motor on
(2) magnetic head feed (seek)
(3) erasure operation
(4) writing operatin
(5) spindle motor off
(6) magnetic head feed (calibrate)

Control Operation 2

Command data ($D_7$, $D_6$, $D_5$, $D_4$, $D_3$, $D_2$, $D_1$, $D_0$)
 = (0 0 1 1 1 1 1 0)

(1) spindle motor on
(2) magnetic head feed (seek)
(3) data transfer

-continued
Command data ($D_7$, $D_6$, $D_5$, $D_4$, $D_3$, $D_2$, $D_1$, $D_0$)
 = (0 0 1 1 1 1 1 0)

(4) erasure operation
(5) writing operation

Control Operation 3

Command data ($D_7$, $D_6$, $D_5$, $D_4$, $D_3$, $D_2$, $D_1$, $D_0$)
 = (0 0 1 1 0 1 1 0)

(1) spindle motor on
(2) magnetic head feed (seek)
(3) erasure operation
(4) writing operation Control Operation 4

Command data ($D_7$, $D_6$, $D_5$, $D_4$, $D_3$, $D_2$, $D_1$, $D_0$)
 = (0 0 1 0 0 0 0 1)

(1) spindle motor on
(2) magnetic head feed (seek)
(3) reading operation
(4) spindle motor off
(5) magnetic head feed (calibrate)

Control Operation 5

Command data ($D_7$, $D_6$, $D_5$, $D_4$, $D_3$, $D_2$, $D_1$, $D_0$)
 = (0 0 1 1 1 0 0 1)

(1) spindle motor on
(2) magnetic head feed (seek)
(3) reading operation
(4) data transfer A series of control operations in which command data, such as (0 0 1 0 1 1 0), is afforded as the command data ($D_7$, $D_6$, $D_5$, $D_4$, $D_3$, $D_2$, $D_1$, $D_0$) by host computer 3 to the command register of interface circuit 11, will be explained in detail.

The microprogram control section or controller 12a interprets or construes the above command data (0 0 1 0 1 1 0) to afford the command signal for the on-state of spindle motor 7 (M on) and the track number (TR #) from the instruction execute section 12b by serial transfer to microcomputer 6 of the mechanical deck system controlled upon reception of the command signal (M on) and the track number (TR #), microcomputer 6 of the mechanical system controller causes spindle motor 7 to be started to cause floppy disk 1 to rotate, while shifting magnetic head 2 by feed motor 8 to the position of the specified track number (TR #). During this time, host computer 3 is advised by microprogram controller 12a that the ready state for receiving the transferred data is completed. Host computer 3 then causes the data to be transferred to buffer memory 13 by way of data register 25 of interface circuit 11. Instruction execute section 12b is also advised by microcomputer 6, functioning as the mechanical system controller, that the revolutions of spindle motor 7 are stable and the shifting of magnetic head 2 is complete, with the recording/reproducing apparatus being in the ready state for recording. Error correcting processor 13 generates the error correcting parity codes on the data transferred from host computer 3 to buffer memory 4. As the instruction execute section 12b is advised by microprogram controller 12a about the completion of the ready state for recording, and the parity codes are completely generated by error correction processor 13, microprogram controller 12a actuates the recording circuit and the erasure circuit after floppy disk 1 has been rotated to the start position of the target sector, so that the data are erased by the preceding erase head while data are recorded by a recording/reproducing head. Microprogram controller 12a provides the motor off signal (M off) for spindle motor 7 to microcomputer 6 by serial transfer to stop spindle motor 7 from revolving. Controller 12a also advises host computer 3 that the data recording operation is now terminated. The read-only code is arranged so as to have different bit patterns depending on whether the sector is for read-only or not.

Figure 10C:
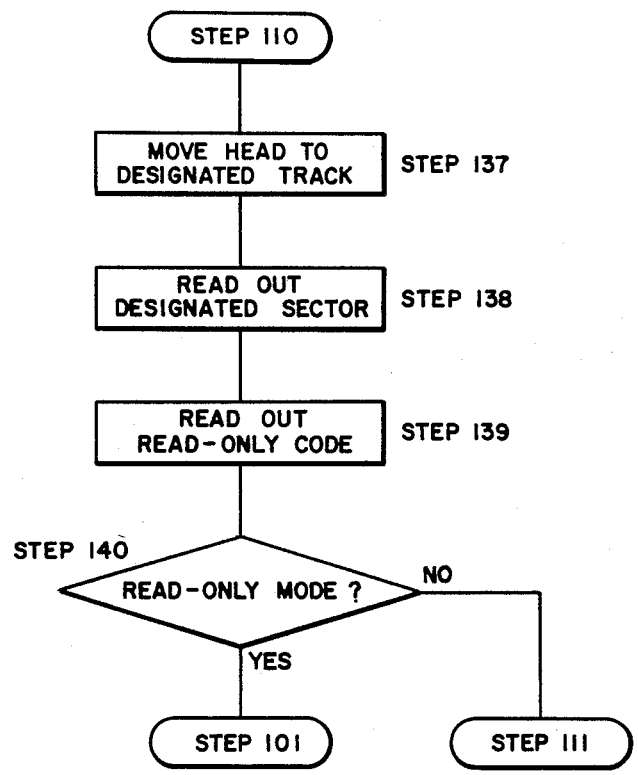

Now, with reference to the flow chart of FIG. 10C, a description will be given on the operation for writing data into a desired sector or all sectors, that is, 4 sectors, on a desired track of floppy disk 1. In the flow chart of FIG. 10B, a sub-routine is called upon termination of step 110 and as shown in FIG. 10C at step 137 of that subroutine magnetic head 2 is driven by motor 8 to the designated track. In this case, because the track pitch is different depending on the areas of the disk, as shown in FIGS. 1 and 2, the known techniques relating to tracking may be employed for moving the head to its proper position. Subsequently, data in a specified sector of the track is read out at step 138 of the sub-routine of FIG. 10C. The read-only code of the sub-code in the data that is read out at step 139 and according to the read-only code thus obtained a decision at step 140 is made as to whether or not the sector belongs to a read-only track TR(R). If the result of such decision is YES, to signify that the sector belongs to a read-only track TR(R), the sub-routine proceeds to step 101 in the flow chart of FIG. 10A; and if the result is NO, to signify that the sector does not belong to a read-only track TR(R), it proceeds to step 111 in the flow chart of FIG. 10B, thereby averting erroneous writing into the read-only track.

Thus, according to the recording disk of the present invention on which a read-only track area AR(R) is provided, it becomes possible to reduce at least the positional error of the track formed in a write operation by a dedicated writing apparatus, so that the track pitch or the guard band width can be narrowed correspondingly. Furthermore, by providing a separate writable track area AR(W/R) data writing can be performed as well as reading out pre-recorded information with only a single disk. In addition, erroneous writing (erasure) in the read-only track area AR(R) is preventable by the existence of the guard band GB(W) which is formed between the read-only track area AR(R) and the writable track area AR(W/R), and this guard band has a sufficient width w to avert erroneous writing into the read-only track AR(R) during the time that data is being written into the writable track area AR(W/R).

It is to be understood that the present invention is not limited to a magnetic disk alone and may also be applied to some other recording disk, such as a magneto-optical type.

Figure 11:
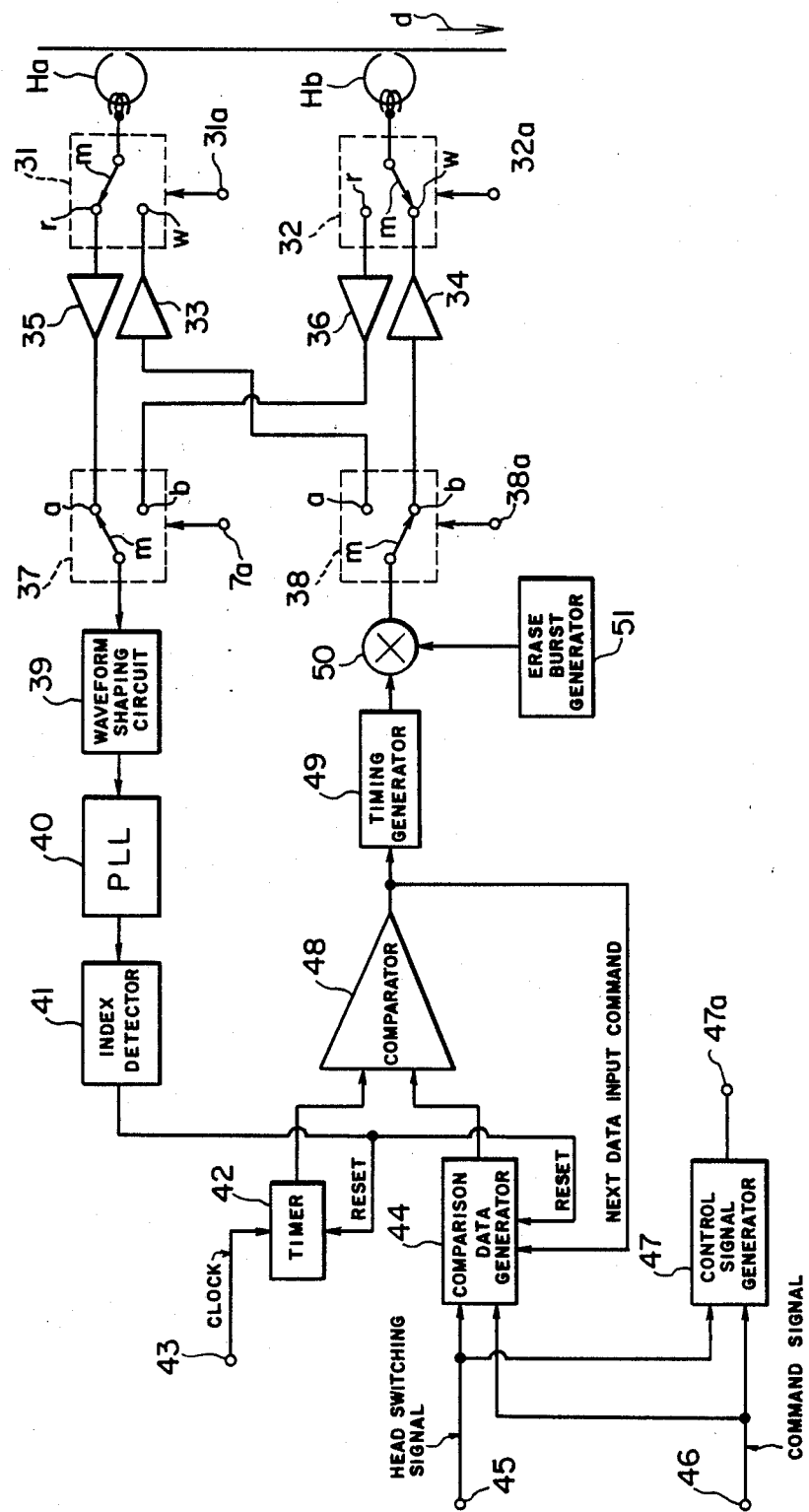
FIG. 11 is a circuit diagram of a recording/reproducing/erasing circuit employed in the driving apparatus according to an embodiment of the present invention.

FIG. 11 shows recording/reproducing circuit 5 of FIG. 8 in more detail, in which the magnetic head that performs the recording/reproducing/erasing operation is a multi-head structure consisting of two heads Ha and Hb, with a respective pair of gaps 2a and 2b of mutually different azimuths. Heads 2a and 2b are so disposed as to scan the same track on a magnetic disk. The azimuths have the same absolute values in the scanning direction but the angles are reversed in sign. As shown in FIG. 2, the space $\Delta s$ between gaps 2a and 2b of magnetic head 2 is smaller than any of the gaps GAP0 to GAP3 between the tracks shown in FIG. 3. In FIG. 11, write/read selector switches 31 and 32 are connected to heads Ha and Hb, respectively, and each switch is equipped with a movable contact m, a write-side fixed contact w, and a read-side fixed contact r. The movable contacts m of selector switches 31 and 32 are connected to the magnetic heads Ha and Hb, respectively. Meanwhile, the write-side fixed contacts w are connected respectively to the output of write amplifiers 33 and 34, and the read-side fixed contacts r are connected respectively to the inputs of read amplifiers 35 and 36. Switches 31 and 32 are actuated by control signals fed to input terminals 31a and 32a thereof, respectively, from a control. Similarly selector switches 37 and 38 are each equipped with a movable contact m, a fixed contact a for the magnetic head Ha and another fixed contract b for the magnetic head Hb. The fixed contacts a and b of selector switch 37 are connected respectively to the outputs of read amplifiers 35 and 36, and the movable contact m thereof is connected to the input of a waveform shaping circuit 39 which will be described below. Meanwhile, the fixed contacts a and b of selector switch 38 are connected respectively to the input of write amplifiers 33 and 34, and the movable contact m thereof is connected to the output of a gate circuit 20. Selector switches 37 and 38 are controlled by control signals fed to input terminals 37a and 38a thereof, respectively, from the control signal generator.

In a read operation, the signal in each track is read out therefrom by magnetic head Ha or Hb having the same gap azimuth as the recording azimuth of the track.

The data read out from the magnetic disk by magnetic head Ha or Hb is then fed via read amplifier 35 or 36 to the fixed contact a or b of selector switch 37. The data selected through switch 37 is fed to waveform shaping circuit 39, and the shaped data is fed via a PLL circuit 30 to an index detector 41, which then detects a signal synchronously with the trailing edge of the index signal written in each track on the same radius. The index detection signal thus obtained is fed as a reset signal to both a timer 42 of an erasure timing control circuit and a comparison data generator 44 to reset them.

Clock pulses of a predetermined frequency are fed to timer 42 from an input terminal 43 and are counted by timer 42, which is reset in response to the index detection signal obtained from index detector 41 and, subsequently, the count in timer 42 is resumed from 0 to 1, 2, 3, and so forth.

Comparison data generator 44 is a circuit for generating data that represents the number of clock pulses from the timing of the index detection signal to the initial timing of the first of one to several sector signals and also to the final timing of the last sector signal.

If it is assumed in the circuit of FIG. 11, that the magnetic disk is rotated in the direction of arrow d with respect to magnetic heads Ha and Hb. Then, referring to the waveforms of FIGS. 12A and 12B, in the index signal IND and the sector signals SC-0, SC-1, SC-2 . . . read out by magnetic heads Ha and Hb, each signal from magnetic head Ha will be delayed, compared with the signal from magnetic head Hb. As shown in FIGS. 12A and 12B, this delay will be of a time $\Delta t$ obtained by dividing the space $\Delta s$ between the gaps 2a and 2b of magnetic heads Ha and Hb by the linear velocity of the track being scanned. Because such linear velocity is different in the outer and inner portions of the magnetic disk, it follows that the time Δt is also different. In consideration of the average value of such time Δt, comparison data generator 44 generates data that represents the number of clock pulses from the timing of the index detection signal to the beginning of each sector signal and also to the end thereof. In this case, it is possible to modify the circuit in such a manner as to generate data representing the number of clock pulses from the timing of the index detection signal to the initial timing of the first one of several sector signals and also to the final timing of the last sector signal after one rotation of the magnetic disk.

In comparison data generator 44, either magnetic head Ha or Hb for the track to be erased is selected in response to the head switching signal from the input terminal in such a manner that the signal in one track is erased by a magnetic head having a gap azimuth different from the recording azimuth of such one track, while the signal in the other track is erased by a magnetic head with the gap azimuth different from the recording azimuth of such other track, and the data representing the number of clock pulses from the timing of the index detection signal to the initial timing of the first of one to several sector signals and also to the final timing of the last sector signal are generated in accordance with the sector number in the track to be erased in response to an erasure sector command signal from an input terminal 46.

The counted value from timer 42 and the clock pulse data from comparison data generator 44 are compared with each other by a comparator 48. When a coincidence signal is obtained, the instant of generation of such coincidence signal corresponds to the initial timing of the first of one to several sector signals to be read, or to the final timing of the last sector signal. Such coincidence signal is fed to comparison data generator 44 to indicate input of the next data. Simultaneously, the coincidence signal is fed also to a timing generator 49, which then generates a gate signal of a duration from the initial timing of the first of several sector signals to the final timing of the last sector signal, and the gate signal thus, generated is fed to a multiplier circuit 50 that functions as a gate circuit. A control signal generator 47 receives a head switching signal from one input terminal 45 and also an erase sector command signal from another input terminal 46 and generates at its output terminal 47a a control signal to be fed to selector switches 31, 32, 37, and 38.

An erase burst generator 51 generates an AC erase signal, which is a so-called erase burst signal, fed via circuit 50, which also receives the timing signal from timing generator 49, to movable contact m of selector switch 38. The erase burst signal passed selectively through switch 38 is then fed to magnetic head Ha or Hb via write amplifier 33 or 34 and the selector switch 31 or 32, so that the desired sector of the track on magnetic disk 1 is erased.

In the magnetic disk driving apparatus described above, when the data in the desired sector of one track is to be erased, the index signal is extracted from the read-out data of magnetic head Ha, and the erasure start timing and the erasure end timing (or those after one rotation of the magnetic disk) of the data in the sector to be erased by magnetic head Hb are determined in accordance with the trailing edge of such index signal. During the time period thus determined, the erase burst signal is fed to magnetic head Hb to erase the desired sector. In this case, the track is erased by the magnetic head Hb whose gap azimuth is different from the recording azimuth of that track, hence averting an ineffective erasing, and preventing a subsequent deterioration of the carrier-to-noise ratio (C/N) or error rate of the reproduced signal that may otherwise be caused by the residual magnetization of the erasure pattern.

Erasure of a signal in a portion of the magnetic disk really is the same as recording therein an AC erase signal or the like of relatively high power level. Accordingly, if the recording azimuth of the erase signal is coincident with the recording azimuth of the head that formed the track, there occurs a deterioration of the C/N (or error rate) of the signal reproduced by reading out the written signal, whereby a fault may be indicated that the written signal fails to be properly read out. However, due to inventive embodiment described above, any desired portion of the magnetic disk can be erased with certainty, and it becomes possible to avert any deterioration in playback quality, which may result from the residual magnetization of the erasure pattern.

It is to be understood that the above erasure technique may be applied also to a writable disk of another type without any read-only area.

Figure 13A:
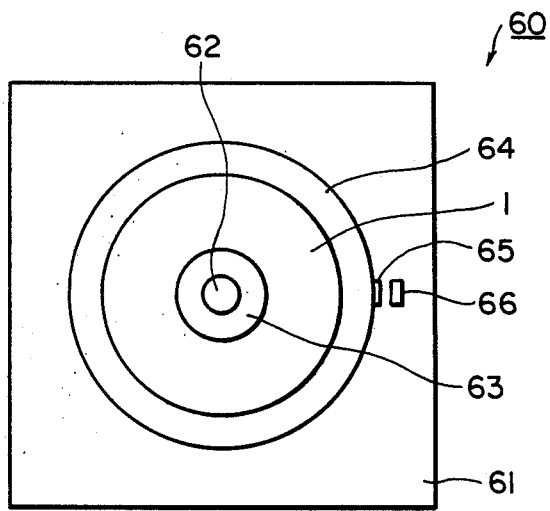
FIGS. 13A and 13B are schematic representations of an index recording unit according to an embodiment of the present invention.
Figure 13B:
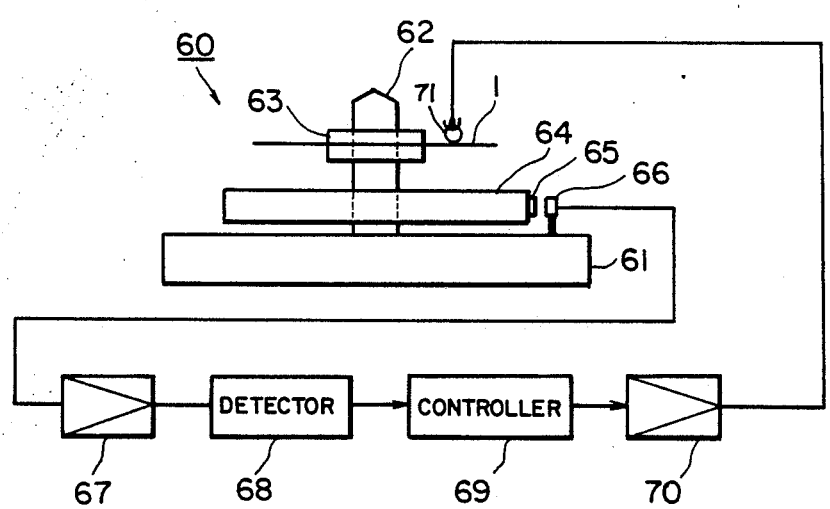

Referring now to FIG. 13, a device for recording an index signal of the track format shown in FIG. 1 is shown, in which it is assumed that such index recording device is incorporated in a dedicated disk writing apparatus. In the index recording device 60, a drive spindle 62 is mounted on a base 61 in such a manner as to be rotated by a spindle motor (not shown) that is housed in base 61, and floppy disk 1 that is to be recorded is detachably held by a chucking element 63 to spindle 62. Spindle 62 also includes a rotor 64 secured thereto. A magnetic field generating element 65, which may comprise a magnet, is attached to the peripheral surface of rotor 64, and a magnetic field detecting means 66, such as a Hall-effect element, is attached to base 61 at a position opposite element 65.

A detection signal obtained from Hall element 66 is fed via an amplifier 67 to a detector 68, and an output signal from detector 68 is fed to a system controller 69. Then, at a predetermined rotational angular position of floppy disk 1, an index signal is generated from controller 69 in response to the detection signal, and such index signal is fed via an amplifier 70 to a magnetic head 71, together with the data signal, or by itself when used for initialization, to be written in floppy disk 1.

Thus, the floppy disk 1 is furnished with the index signal written at its predetermined rotational angular position. Accordingly, by following the present invention there is no requirement to provide any particularly physical means in floppy disk 1 to indicate the predetermined rotational angular position, hence realizing a cost reduction of the floppy disk. Furthermore, in the floppy disk driving controller, there is no necessity of providing any particular means to detect the predetermined rotational angular position of the floppy disk, thereby reducing the production cost of the floppy disk driving apparatus.

Although a description has been given hereinabove with regard to an exemplary case of employing the index recording device in a dedicated disk writing apparatus, such device may be provided in the floppy disk driving apparatus of FIG. 3 adapted for both writing and reading.

According to the above-described system, the recording density can be increased to a great extent in the magnetic disk of the invention, yet proper data writing is still possible.

The above description is given on a single preferred embodiment of the invention, but it will be apparent that many modifications and variations could be effected by one skilled in the art without departing from the spirit or scope of the novel concepts of the invention, which should be determined by the appended claims.

What is claimed is:

1. A recording disk comprising:
    a magnetic recording medium forming the recording disk;
    a read-only track area including a plurality of read-only tracks each separated by read-only guard band;
    a writable track area including a plurality of writable tracks, each separated by a write guard band; and
    an additional write guard band between a last read-only track in said read-only track area and an adjacent writable track in said writable track area, all of said write guard bands having a selected width wider than said read-only guard bands for preventing erroneous writing into said read-only track area during writing of data into said writable track area.

2. A recording disk according to claim 1, wherein said read-only track area contains data recorded therein and wherein said data includes a read-only code for preventing said read-only track area from being written and erased.

3. A recording disk according to claim 1, wherein a recording azimuth of the read-only tracks and a writable track adjacent to each other are selected to be equal and in opposite directions.

* * * * *